US011947115B2

(12) United States Patent
Takeda et al.

(10) Patent No.: US 11,947,115 B2
(45) Date of Patent: Apr. 2, 2024

(54) VIRTUAL IMAGE DISPLAY APPARATUS COMPRISING AN OPTICAL UNIT HAVING A PROJECTION OPTICAL SYSTEM, A TURNING MIRROR, A TRANSMISSION MIRROR, AND A CONCAVE MIRROR

(71) Applicant: SEIKO EPSON CORPORATION, Tokyo (JP)

(72) Inventors: Takashi Takeda, Suwa (JP); Takeshi Koshihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 283 days.

(21) Appl. No.: 17/389,373

(22) Filed: Jul. 30, 2021

(65) Prior Publication Data

US 2022/0035165 A1 Feb. 3, 2022

(30) Foreign Application Priority Data

Jul. 30, 2020 (JP) ................. 2020-129063

(51) Int. Cl.
*G02B 27/01* (2006.01)
*G02B 27/00* (2006.01)

(52) U.S. Cl.
CPC ..... *G02B 27/0172* (2013.01); *G02B 27/0025* (2013.01); *G02B 2027/0178* (2013.01)

(58) Field of Classification Search
None
See application file for complete search history.

(56) References Cited

U.S. PATENT DOCUMENTS

| 5,537,253 | A | 7/1996 | Cox et al. |
| 2007/0171532 | A1 | 7/2007 | Yamazaki |
| 2007/0252905 | A1* | 11/2007 | Kamiya ............... G06T 3/60 348/241 |
| 2014/0139553 | A1* | 5/2014 | Takeda ............... G02B 27/017 345/633 |
| 2015/0261046 | A1 | 9/2015 | Miki et al. |
| 2016/0203745 | A1 | 7/2016 | Park |
| 2017/0257620 | A1* | 9/2017 | Takeda ............... H04N 13/344 |
| 2020/0033573 | A1 | 1/2020 | Takeda et al. |
| 2020/0033607 | A1 | 1/2020 | Takeda et al. |
| 2020/0310126 | A1* | 10/2020 | Otsuka ............... G02B 27/017 |

FOREIGN PATENT DOCUMENTS

| CN | 110780443 | 2/2020 |
| CN | 110780444 | 2/2020 |
| JP | H07104209 | 4/1995 |
| JP | H08506429 | 7/1996 |
| JP | H1130764 | 2/1999 |
| JP | 2019045630 | 3/2019 |
| JP | 2020034722 | 3/2020 |

* cited by examiner

Primary Examiner — Paul C Lee
(74) Attorney, Agent, or Firm — JCIPRNET

(57) ABSTRACT

An imaging light emitting device, and an optical unit configured to guide imaging light emitted from the imaging light emitting device are included, and the imaging light emitting device emits the imaging light at different densities according to a distortion generated in an optical system constituting the optical unit and an image position.

7 Claims, 15 Drawing Sheets

VIRTUAL IMAGE DISPLAY APPARATUS COMPRISING AN OPTICAL UNIT HAVING A PROJECTION OPTICAL SYSTEM, A TURNING MIRROR, A TRANSMISSION MIRROR, AND A CONCAVE MIRROR

The present application is based on, and claims priority from JP Application Serial Number 2020-129063, filed Jul. 30, 2020, the disclosure of which is hereby incorporated by reference herein in its entirety.

BACKGROUND

1. Technical Field

The present disclosure relates to a virtual image display apparatus such as a head-mounted display that enables formation and observation of a virtual image.

2. Related Art

As a virtual image display apparatus that enables formation and observation of a virtual image such as a head-mounted display, an image display device that simultaneously performs corrections of distortion aberrations (distortion) and corrections for the aspect ratio conversion is known (see JP-A-2019-45630).

Specifically, the image display device described in JP-A-2019-45630 includes an eyepiece optical system that guides the light from an original image to the observer's eyes, and performs simultaneously a first correction based on optical aberrations of the eyepiece optical system and a second correction based on a difference in focal lengths in two cross sections with respect to an input image. At this time, an anamorphic optical system is used as the eyepiece optical system.

However, in a case such as JP-A-2019-45630, for example, since the lens side bears the load for the correction of the distortion aberrations (distortion). Therefore, it may lead an increase in size of the lens, consequently in size of the device, and complexity of the lens.

SUMMARY

A virtual image display apparatus according to an aspect of the present disclosure includes an imaging light emitting device configured to include a display portion emitting imaging light, and an optical unit configured to guide the imaging light emitted from the imaging light emitting device, wherein the display portion has a first region and a second region, the first region according to a distortion generated in the optical unit, the number of pixels in the first region being different from the number of pixels in the second region.

DESCRIPTION OF EXEMPLARY EMBODIMENTS

First Embodiment

Next, a virtual image display apparatus according to a first embodiment of the present disclosure and an optical unit incorporated therein will be described with reference to drawings.

Figure 1:
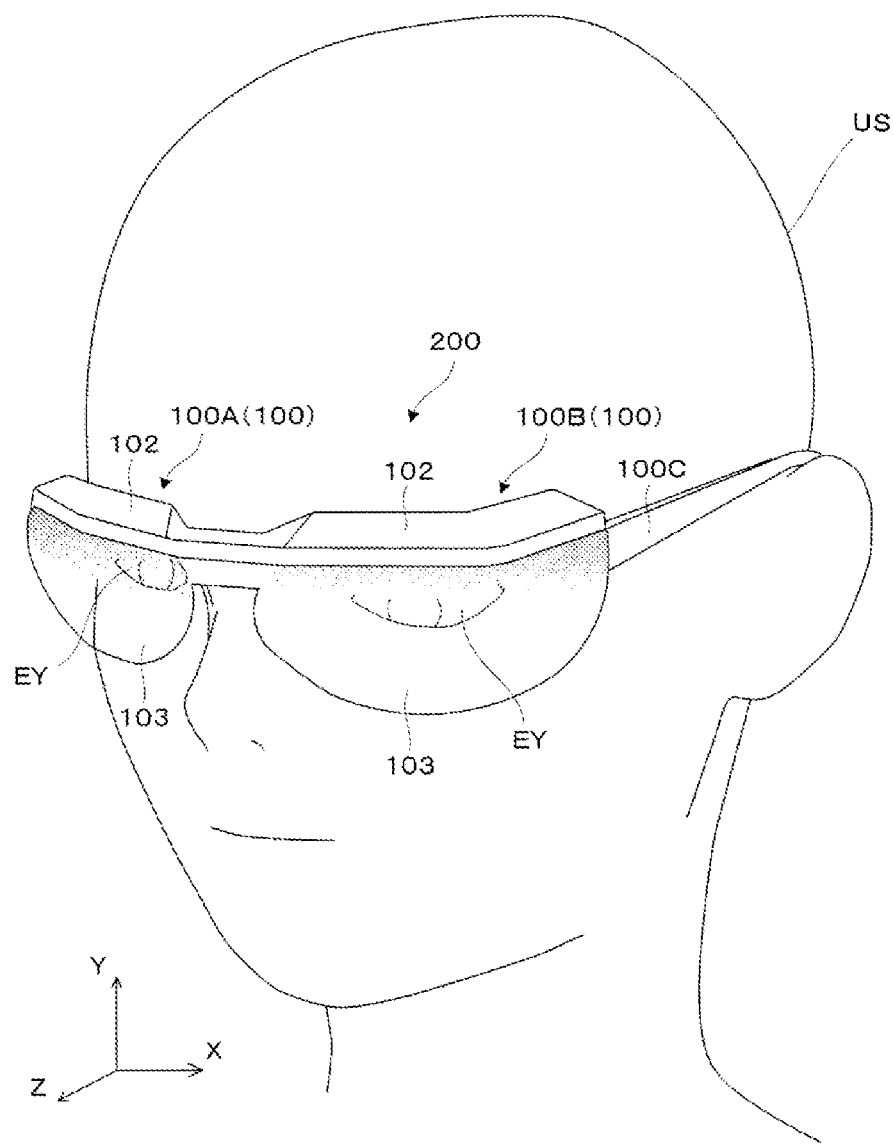
FIG. 1 is an external perspective view illustrating a mounted state of the virtual image display apparatus of a first embodiment.

FIG. 1 is a perspective view illustrating the appearance of a head-mounted display (hereinafter, also referred to as an HMD) 200, and the head-mounted display causes an observer or a wearer US who wears the head-mounted display to recognize an image as a virtual image. In FIG. 1 and the like, X, Y, and Z are an orthogonal coordinate system, a +X direction corresponds to a lateral direction in which both eyes EY of the observer or wearer US wearing the HMD 200 or a virtual image display apparatus 100 are aligned, a +Y direction corresponds to an upward direction orthogonal to the lateral direction in which both eyes EY of the wearer US are aligned, and a +Z direction corresponds to a front direction of the wearer US or a front surface direction. ±Y direction is parallel to a vertical axis or a vertical direction.

The HMD 200 includes a first display device 100A for the right eye, a second display device 100B for the left eye, and a support device 100C in a temple shape which supports the display devices 100A and 100B. The first display device 100A includes a display driving unit 102 arranged at an upper portion thereof and an appearance member 103 that has a spectacle lens shape and covers the front of the eye. Similarly, the second display device 100B includes the display driving unit 102 arranged at an upper portion thereof and the appearance member 103 that has a spectacle lens shape and covers the front of the eye. The support device 100C supports an upper end side of the appearance member 103 via the display driving unit 102. The display device 100A and the display device 100B are arranged with the right and left sides reversed, and the display device 100A for the right eye will be described below as a representative of the virtual image display apparatus 100.

Figure 2:
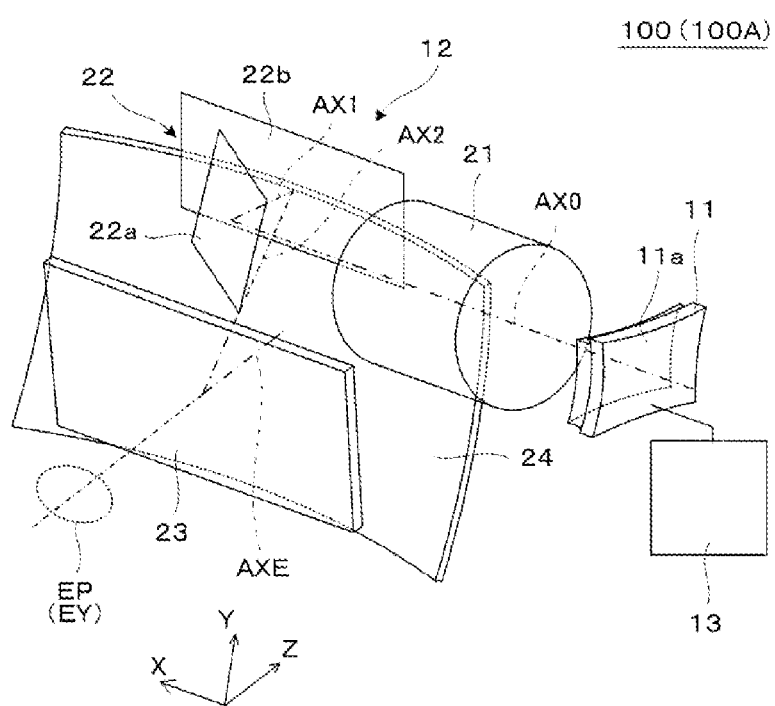
FIG. 2 is a perspective view illustrating a structure of the virtual image display apparatus and the like of FIG. 1.
Figure 3:
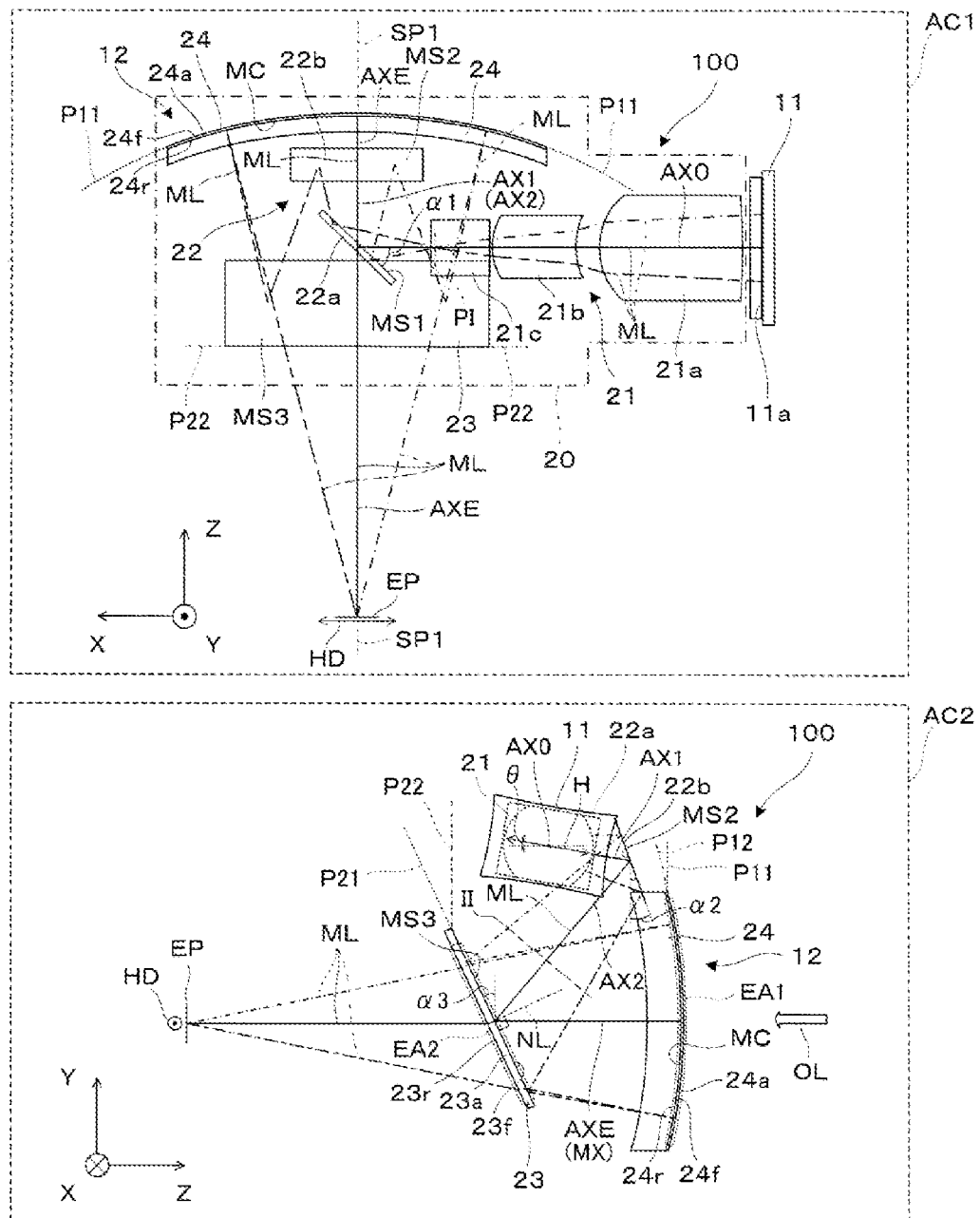
FIG. 3 is a plan view and a side view of the virtual image display apparatus of FIG. 1.

FIG. 2 is a perspective view illustrating the virtual image display apparatus 100, which is the display device 100a for the right eye. FIG. 3 is a diagram illustrating an optical structure of the virtual image display apparatus 100. In FIG. 3, a first region AC1 is a plan view of an imaging light emitting device 11 and an optical unit 12, and a second region AC2 is a side view of the imaging light emitting device 11 and the optical unit 12.

As illustrated in FIG. 2, the virtual image display apparatus 100 includes the imaging light emitting device 11, the optical unit 12, and a display control circuit 13. However, in the present specification, a configuration in which the display control circuit 13 is excluded is also referred to as the virtual image display apparatus 100, from the viewpoint of achieving an optical function.

The imaging light emitting device 11 is a self-luminous type display device which employs, for example, organic EL (organic electro-luminescence, Organic Electro-Luminescence), and forms a still image or a moving image in color on a two-dimensional display surface 11a. The imaging light emitting device 11 is driven by the display control circuit 13 to perform a display operation. The imaging light emitting device 11 is not limited to organic EL, and may be replaced with an inorganic EL, an LED array, an organic LED, a laser array, a quantum dot light emitting element, and the like. The imaging light emitting device 11 is not limited to the self-luminous type imaging light emitting device, and may include an LCD or another light modulating element, and may form an image by illuminating the light modulating element with a light source such as a backlight. As the imaging light emitting device 11, a liquid crystal on silicon (LCOS) (LCoS is a registered trademark), a digital micromirror device, and the like may be used instead of the LCD. In the imaging light emitting device 11, the display surface 11a is a display portion that is distorted according to the distortion generated in the optical unit 12, and the imaging light emitting device 11 emits imaging light ML at different densities in accordance with the distortion generated in an optical system constituting the optical unit 12 and an image position (emission position on the display surface 11a). Details of light emission from the imaging light emitting device 11 will be described later.

As illustrated in FIGS. 2 and 3, the optical unit 12 includes a projection optical system 21, a turning mirror 22, a transmission tilted mirror 23, and a concave transmission mirror 24, and guides the imaging light ML emitted from the imaging light emitting device 11 to form an exit pupil EP. Here, an optical path from the imaging light emitting device 11 to the turning mirror 22 is arranged at an upper side of the transmission tilted mirror 23. In the optical unit 12, a projection optical axis AX0, which is an optical axis of the projection optical system 21, is arranged in a direction that crosses a virtual reference plane SP1 that is parallel to a YZ plane including a reflection optical axis AX2, which is an optical axis from the turning mirror 22 toward the transmission tilted mirror 23, and an emission optical axis AXE, which is an optical axis from the concave transmission mirror 24 toward the exit pupil EP. In this optical unit 12, for example, the reflection optical axis AX2 forms an angle with respect to the Y direction in the vertical direction, and the turning mirror 22 and the transmission tilted mirror 23 form an optical path that is tilted, twisted, and bent.

The projection optical system 21 projects the imaging light ML emitted from the imaging light emitting device 11. The projection optical system 21 converges the imaging light ML emitted from the imaging light emitting device 11 so as to form an image, and causes the imaging light ML to be incident on the turning mirror 22. The projection optical system 21 is not limited to a single lens, and in the example illustrated in FIG. 3, the projection optical system 21 includes three lenses 21a, 21b, and 21c, but may be constituted by two lenses or four or more lenses. The lenses 21a, 21b, and 21c are not limited to spherical lenses, and may be aspherical lenses. The projection optical axis AX0, which is the optical axis of the projection optical system 21, extends parallel to the horizontal X-axis direction.

The turning mirror 22 includes a first mirror 22a and a second mirror 22b in the order of the optical path from the imaging light emitting device 11. The turning mirror 22 reflects the imaging light ML from the projection optical system 21 in a crossing direction. Here, the crossing direction is a direction that forms an angle greater than 0° with respect to the projection optical axis AX0, and includes a direction that is in a twisted relationship. In the case of the present embodiment, the turning mirror 22 bends the optical path in the vertical direction, which is in the twisted relationship. The transmission tilted mirror 23, which will be described later, is arranged on the light emission side of the second mirror 22b, and the transmission tilted mirror 23 may be also referred to as a third mirror. An entrance pupil PI of the virtual image display apparatus 100 is arranged in front of the turning mirror 22, that is, at the imaging light emitting device 11 side that is in a reverse direction to a traveling direction of the imaging light ML.

The first mirror 22a is a flat plate-shaped optical member and has a planar reflective surface MS1. The planar reflective surface MS1 of the first mirror 22a is made of a metal film or a dielectric multilayer film. In this case, a reflective film made of a single-layer film or a multilayer film formed from a metal such as Al or Ag is deposited on a flat plate surface by vapor deposition or the like. The first mirror 22a bends the imaging light ML traveling in the horizontal X direction by the planar reflective surface MS1 in a forward direction and causes the imaging light ML to be incident on the second mirror 22b. At this time, the projection optical axis AX0, which is the optical axis of the projection optical system 21, and a reflection optical axis AX1 from the first mirror 22a toward the second mirror 22b cross each other. The reflection optical axis AX1 extends along the YZ plane in the +Z direction and the −Y direction, and is inclined in the forward obliquely downward direction. The first mirror 22a is fixed to a frame of the display driving unit 102 illustrated in FIG. 1 by a member not illustrated.

The first mirror 22a or the planar reflective surface MS1 is inclined at an angle α1=45° in a clockwise direction about the Y-axis when viewed from above with respect to the XY plane, when the XY plane extending in the vertical direction is used as a reference. When projected onto the XZ plane, a normal line of the planar reflective surface MS1 extends in an intermediate direction between the +Z direction and the −X direction and in a direction of 45° with respect to each of the +Z direction and the −X direction. The first mirror 22*a* is also tilted around the X-axis so as to be slightly prone toward the second mirror 22*b*.

The second mirror 22*b* is a flat plate-shaped optical member and has a planar reflective surface MS2. The planar reflective surface MS2 of the second mirror 22*b* is made of a metal film or a dielectric multilayer film. In this case, a reflective film made of a single-layer film or a multilayer film formed from a metal such as Al or Ag is deposited on a flat plate surface by vapor deposition or the like. The second mirror 22*b* bends the imaging light ML traveling in the forward direction by the planar reflective surface MS2 in a rearward direction and causes the imaging light ML to be incident on the transmission tilted mirror 23. At this time, the reflection optical axis AX1 from the first mirror 22*a* toward the second mirror 22*b* and the reflection optical axis AX2 from the second mirror 22*b* toward the transmission tilted mirror 23 cross each other. The reflection optical axis AX2 extends along the YZ plane in the −Z direction and the −Y direction, and is inclined in the rearward obliquely downward direction. The second mirror 22*b* is fixed to the frame of the display driving unit 102 illustrated in FIG. 1 by a member not illustrated.

The second mirror 22*b* or the planar reflective surface MS2 is inclined at an angle $\alpha 2=20°$ to 40° in a counterclockwise direction about the X-axis when viewed from the imaging light emitting device 11 with respect to the XY plane, when the XY plane extending in the vertical direction is used as a reference. A normal line of the planar reflective surface MS2 is in a plane parallel to the YZ plane and is inclined at approximately 20° to 40° in the counterclockwise direction with respect to the Z-axis.

The transmission tilted mirror 23 is a flat plate-shaped optical member that functions as a surface mirror having transmissivity, and has a planar reflective surface MS3. In the transmission tilting mirror 23, a metal film or a dielectric multilayer film is formed on one surface 23*f* of a parallel flat plate 23*a* that has a uniform thickness and transmissivity to obtain the planar reflective surface MS3. The reflectance and transmittance of the planar reflective surface MS3 can be arbitrarily set to be dimmed, for example, set to approximately 50%. An antireflection film can be formed on the other surface 23*r* of the parallel flat plate 23*a*. The transmission tilted mirror 23 bends the imaging light ML traveling in the obliquely rearward direction by the planar reflective surface MS3 in the forward direction and causes the imaging light ML to be incident on the concave transmission mirror 24. At this time, the reflection optical axis AX2 from the second mirror 22*b* toward the transmission tilted mirror 23, and the emission optical axis AXE from the transmission tilted mirror 23 toward the concave transmission mirror 24 cross each other. The emission optical axis AXE coincides with an axis MX of the concave transmission mirror 24 and extends in the forward direction which is the +Z direction. Here, the axis MX of the concave transmission mirror 24 refers to a rotational symmetry axis of the concave transmission mirror 24. For example, when the concave transmission mirror 24 deviates from the rotationally symmetric shape, the axis MX of the concave transmission mirror 24 means a normal line that passes through an intersection of the emission optical axis AX and the concave transmission mirror 24, and the normal line of a plane tangent to the concave transmission mirror 24 at this intersection. The transmission tilted mirror 23 is arranged between the concave transmission mirror 24 and the exit pupil EP in which the eye EY or the pupil is arranged, and covers the exit pupil EP. Note that, the emission optical axis AXE is an axis from the transmission tilted mirror 23 toward the concave transmission mirror 24, and is also an axis from the concave mirror 24 toward a center of the exit pupil EP. The transmission tilted mirror 23 can be directly or indirectly fixed to the frame of the display driving unit 102 illustrated in FIG. 1, and can be in a state in which the positional relationship with respect to the concave transmission mirror 24 and the like can be appropriately set.

The transmission tilted mirror 23 or the planar reflective surface MS3 is inclined at an angle $\alpha 3=20°$ to 40° in the counterclockwise direction about the X-axis when viewed from the imaging light emitting device 11 with respect to the XY plane, when the XY plane extending in the vertical direction is used as a reference. A normal line NL of the planar reflective surface MS3 is in a plane parallel to the YZ plane and is inclined at approximately 20° to 40° in the counterclockwise direction with respect to the Z-axis. As described above, the transmission tilted mirror 23 is arranged so that the angle formed by the Y-axis, which is the vertical axis, and the transmission tilted mirror 23 is less than 45°. If the angle formed by the Y-axis and the transmission tilted mirror 23 is larger than 45°, the transmission tilted mirror 23 is tilted from a standard and the thickness of the transmission mirror in the Z-axis direction increases. However, if the angle formed by the Y-axis and the transmission tilted mirror 23 is smaller than 45°, the transmission tilted mirror 23 stands up more than the standard, and the thickness of the transmission mirror in the Z-axis direction decreases. That is, by setting the angle formed by the Y-axis and the transmission tilted mirror 23 to be less than 45° as in the present embodiment, it is possible to avoid the transmission tilted mirror 23 from being arranged so as to protrude greatly in the −Z direction that is rearward thereof with reference to the concave transmission mirror 24, and an increase in the thickness of the virtual image display apparatus 100 or the optical unit 12 in the Z-direction that is a forward-rearward direction thereof.

The concave transmission mirror 24 is a curved optical member that functions as a surface mirror having transmissivity illustrated in FIG. 1, and has a concave reflective surface MC having a concave shape toward the exit pupil EP. The concave transmission mirror 24 has a light converging function and collimates the imaging light ML reflected and diverged by the transmission tilted mirror 23, and causes the imaging light ML to be incident on the exit pupil EP via the transmission tilted mirror 23. The concave transmission mirror 24 has a concave surface toward the exit pupil EP, and as a result of having a convex surface in which the concave surface is inverted toward the outside, the concave transmission mirror 24 has a uniform thickness while being curved. A plate-shaped body 24*a* of the concave transmission mirror 24 is a base material that determines the outer shape of the concave transmission mirror 24. The plate-shaped body 24*a* has transmissivity for transmitting light at a predetermined transmittance. A metal film or a dielectric multilayer film is formed as a transmissive reflection film on one surface 24*r* of the plate-shaped body 24*a*, and the transmissive reflection film functions as the concave transmission reflective surface MC. The reflectance of the planar reflective surface MS3 is set to, for example, 20% to 50%. An antireflection film can be formed on the other surface 24*f* of the plate-shaped body 24*a*. The concave reflective surface MC is not limited to a spheric surface, and may be an aspheric surface. While reflecting the imaging light ML that is reflected by the transmission tilted mirror 23 and advances forward, and returning the imaging light ML to the transmission tilted mirror 23, the concave transmission mirror 24 partially transmits the imaging light ML through the transmission tilted mirror 23 and collects the imaging light ML to the exit pupil EP. At this time, the emission optical axis AXE from the transmission tilted mirror 23 toward the concave transmission mirror 24 coincides with an optical axis that is turned back by the concave transmission mirror 24 and toward the exit pupil EP. The exit pupil EP is at a position conjugate with the entrance pupil PI that is arranged in front of the turning mirror 22.

The concave transmission mirror 24 is incorporated to form a part of the appearance member 103. That is, the appearance member 103 including the concave transmission mirror 24 can be obtained by providing a plate-shaped member having or not having transmissivity around the concave transmission mirror 24 so as to extend. The appearance member 103 is not limited to a spectacle lens shape, and may have various outlines or appearances.

In the above, the second mirror 22b is not parallel to the transmission tilted mirror 23. In other words, the angle α2, which is the inclination angle of the second mirror 22b, is different from the angle α3, which is the inclination angle of the transmission tilted mirror 23. As a result, when considering the projection optical axis AX0 of the projection optical system 21, that is, when viewed along the projection optical axis AX0, a lateral axis H corresponding to the lateral direction of the image is rotated so as to form an inclination angle θ with respect to the horizontal Z direction. The lateral axis H of the image corresponds to a lateral side of the display surface 11a of the imaging light emitting device 11, when the display surface 11a of the imaging light emitting device 11 is rectangular as illustrated in the drawings. The lateral axis H of the image corresponds to an HD extending parallel to the X direction, when considering the emission optical axis AX passing through the exit pupil EP, that is, when viewed along the emission optical axis AX.

The positional relationship of the turning mirror 22 with respect to the transmission tilted mirror 23 and the concave transmission mirror 24 will be described. The turning mirror 22 is arranged between the transmission tilted mirror 23 and the concave transmission mirror 24. Specifically, the first mirror 22a and the second mirror 22b are arranged in a space having a wedge-shaped cross section sandwiched between an extension plane P21 in which the planar reflective surface MS3 of the transmission tilted mirror 23 is virtually extended and a vertical cylindrical curved surface P11 in which an outside of an upper end of the concave transmission mirror 24 is virtually extended in the vertical Y direction. Further, in order to satisfy more preferable conditions, the first mirror 22a and the second mirror 22b are arranged between a vertical plane P22 in which an upper end of the planar reflective surface MS3 of the transmission tilted mirror 23 is virtually extended in the vertical Y direction and a secondary approximate curved surface P12 in which the outside of the upper end of the concave transmission mirror 24 is virtually extended. In the above, although the space sandwiched between the extension plane P21 in which the planar reflective surface MS3 of the transmission tilted mirror 23 is virtually extended and the vertical cylindrical curved surface P11 in which the outside of the upper end of the concave transmission mirror 24 is virtually extended in the vertical Y direction, is referred to as the space having a wedge-shaped cross section, the space in which the turning mirror 22 is arranged depends on the arrangement and shapes of the transmission tilted mirror 23 and the concave transmission mirror 24, and is not limited to the wedge-shaped cross section. The same applies to another embodiment or modification described below.

It is desirable that the positional relationship of the projection optical system 21 and the imaging light emitting device 11 with respect to the transmission tilted mirror 23 and the concave transmission mirror 24 is the same as that of the turning mirror 22, but is subject to size restrictions such as the length of the projection optical system 21. It is desirable that the projection optical system 21 and the imaging light emitting device 11 are arranged in the space having the wedge-shaped cross section sandwiched between the virtual extension plane P21 of the transmission tilted mirror 23 and the vertical cylindrical curved surface P11 that is virtually set with regard to the concave transmission mirror 24. However, when this is not easy, it is desirable that the projection optical axis AX0 extending from the display surface 11a of the imaging light emitting device 11 to the turning mirror 22 is arranged between the extension plane P21 and the vertical cylindrical curved surface P11. More preferably, the projection optical system 21 and the imaging light emitting device 11 are arranged between the vertical plane P22 that is set with regard to the transmission tilted mirror 23 and the approximate curved surface P12 that is set with regard to the concave transmission mirror 24. However, when this is not easy, it is desirable that the projection optical axis AX0 extending from the display surface 11a to the turning mirror 22 is arranged between the vertical plane P22 and the approximate curved surface P12.

The first mirror 22a and the second mirror 22b constituting the turning mirror 22 are arranged so as to avoid interrupting an effective region EA1 of the concave transmission mirror 24 and an effective region EA2 of the transmission tilted mirror 23. For example, the effective region EA1 is illustrated by a dotted line in the vicinity of the transmission tilted mirror 23. Specifically, a position of the second mirror 22b is arranged at closer side to the imaging light emitting device 11 or the projection optical system 21 than a region formed by the effective region EA1, the effective region EA2, and uppermost and lowermost light rays of angle of view of the imaging light ML reflected by the transmission tilted mirror 23, when viewed from the side. In terms of optical design, it is easy to lower the second mirror 22b constituting the turning mirror 22 in the −Y direction, but when the second mirror 22b or the like is lowered excessively, the field of view from the exit pupil EP is prevented. In this way, the turning mirror 22 is arranged so as to avoid interrupting the effective regions EA1 and EA2 of the concave transmission mirror 24 and the transmission tilted mirror 23, so that it is possible to prevent interference of the turning mirror 22 that is lowered excessively with the concave transmission mirror 24 and the transmission tilted mirror 23. That is, the turning mirror 22 is arranged so as not to block the angle of view corresponding to an image region when viewed from the eye EY or the exit pupil EP of the wearer US.

To describe the optical path, the imaging light ML from the imaging light emitting device 11 is focused so as to be imaged by the projection optical system 21, is sequentially reflected by the first mirror 22a and the second mirror 22b of the turning mirror 22, and is incident on the transmission tilted mirror 23. The imaging light ML reflected by, for example, approximately 50% by the transmission tilted mirror 23 is incident on the concave transmission mirror 24 and reflected by the concave reflective surface MC with a reflectance of, for example, approximately 50% or less. The imaging light ML reflected by the concave transmission mirror 24 is incident on the exit pupil EP in which the eye EY or the pupil of the wearer US is arranged. An intermediate image II is formed between the transmission tilted mirror 23 and the second mirror 22b. The intermediate image II is formed by appropriately enlarging an image formed on the display surface 11a of the imaging light emitting device 11. External light OL that has passed through the concave transmission mirror 24 is also incident on the exit pupil EP. That is, the wearer US wearing the HMD 200 can observe the virtual image by the imaging light ML while superimposing the virtual image on the external image.

In the virtual image display apparatus 100 described above, since the turning mirror 22 is arranged between the transmission tilted mirror 23 and the concave transmission mirror 24, so that it is possible to prevent the turning mirror 22 from protruding in front of the concave transmission mirror 24 and from protruding toward the rearward direction of the transmission tilted mirror 23. Therefore, the entire optical system can be accommodated in a small size, the virtual image display apparatus 100 can be miniaturized, and a smart appearance can be achieved.

Figure 4A:
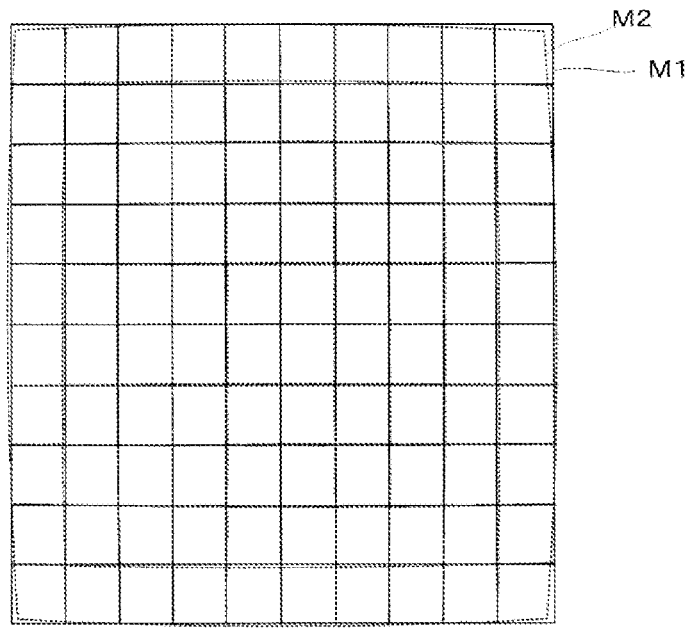
FIG. 4A is a conceptual diagram for describing the state of an aberration generated in an optical unit.

Hereinafter, the light emission from the imaging light emitting device 11 will be described in more detail with reference to FIG. 4A and the like. FIG. 4A is a conceptual diagram for describing the state of aberration generated in the optical unit 12, and FIG. 4B is a conceptual diagram for describing a display portion shape of an imaging light emitting device 11, that is, the shape of the display surface 11a.

First, FIG. 4A is a conceptual diagram illustrating an example of the state of a distortion aberration (distortion) that occurs in an optical system such as the optical unit 12 that constitutes the above-described virtual image display apparatus 100. For example, a mesh M1 illustrated by a solid line in the figure shows an example of an ideal state with no distortion aberration (distortion), or a state before passing through the optical unit 12.

On the other hand, a mesh M2 illustrated by a dotted line in the figure shows a state of the distortion aberration (distortion) caused in the optical unit 12. In other words, when the shape of the display surface 11a is emitted in a state of a rectangular shape as illustrated by the mesh M1, a virtual image visually recognized by the eye EY of the wearer US (see FIG. 1 and the like) is visually recognized as a distorted shape as illustrated by the mesh M2 due to the distortion aberration generated in the optical unit 12.

Figure 4B:
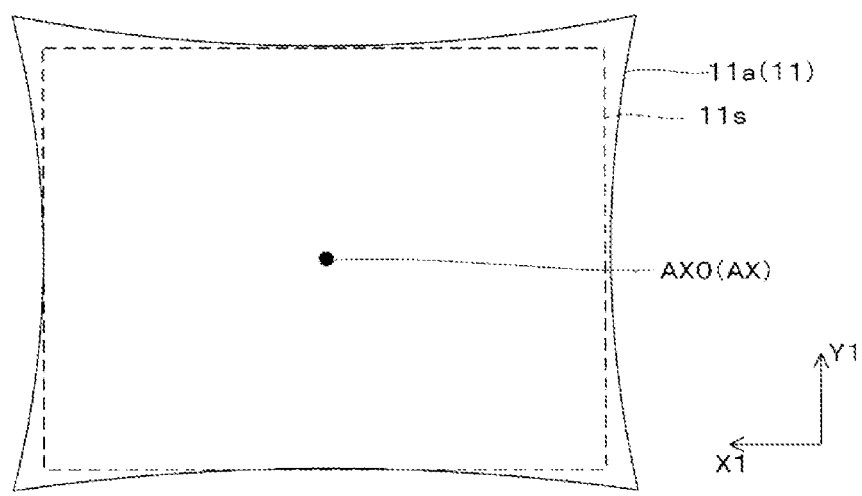
FIG. 4B is a conceptual diagram for describing a display portion shape of an imaging light emitting device.

Taking the above situation into consideration, in the present embodiment, as illustrated in FIG. 4B, the shape of the display surface 11a of the imaging light emitting device 11 is not like a rectangular display surface 11s illustrated by a broken line as a comparative example in the drawings, but is distorted according to the distortion generated in the optical unit 12. That is, the display surface 11a has a shape (spool shape) that causes a reverse distortion that cancels the deformation (barrel shape) due to the aberration illustrated by the dashed line in FIG. 4A. More specifically, as the display surface 11a, a display surface in which the amount of the distortion aberration (distortion) in the optical unit 12 is calculated, and a difference from the state without the distortion aberration (distortion) is corrected as a compensation amount on the panel side is manufactured. From a different point of view, the imaging light emitting device 11 allows the occurrence of the distortion aberration in the optical unit 12 and reduces the burden on the optical system (refractive lens or mirror lens) side.

Hereinafter, a relationship between the aberration generated in the above-described optical unit 12 and an appearance of the virtual image according to the aberration will be described with reference to the conceptual diagrams illustrated in FIGS. 5A to 5C.

Figure 5A:
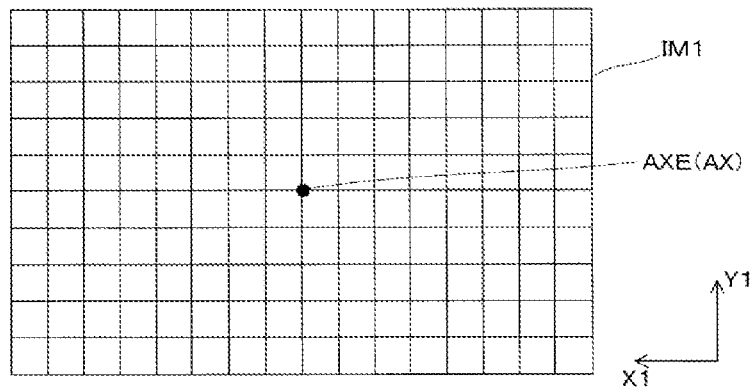
FIG. 5A is a conceptual diagram for describing a relationship between generated aberration and a virtual image according to the aberration.
Figure 5B:
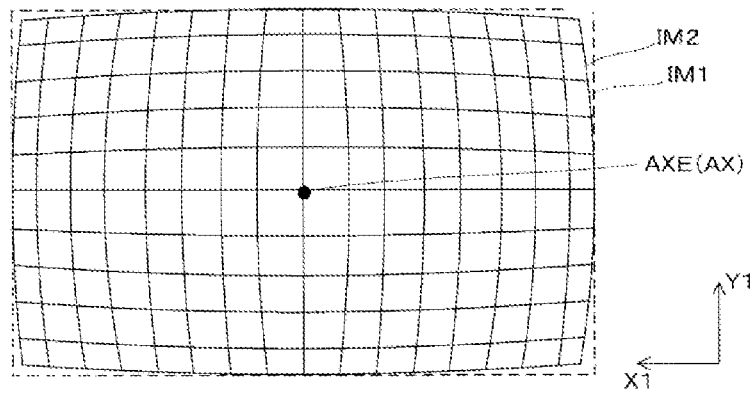
FIG. 5B is a conceptual diagram for describing the relationship between the generated aberration and the virtual image according to the aberration.
Figure 5C:
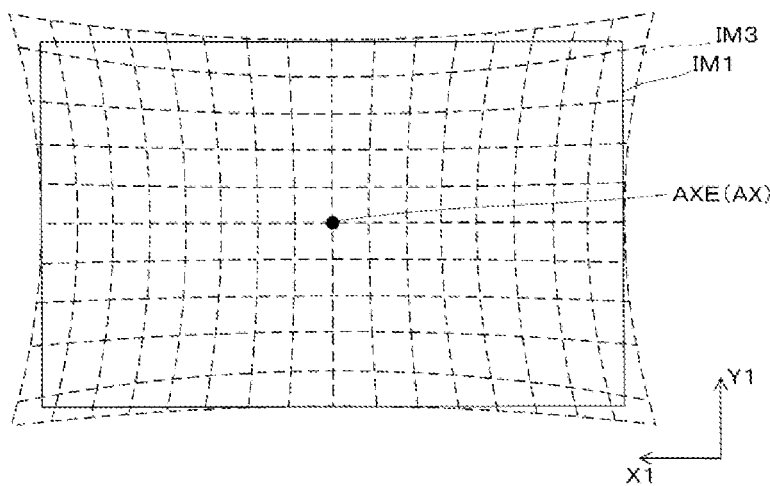
FIG. 5C is a conceptual diagram for describing the relationship between the generated aberration and the virtual image according to the aberration.

In FIG. 5A, a virtual image IM1 as a rectangular region illustrated in a mesh shape is a virtual image as a target state to be visually recognized. On the other hand, in FIG. 5B, a virtual image IM2 illustrated in a mesh shape as a region is a virtual image that is visually recognized when the imaging light ML is emitted from a rectangular display portion that is similar to the virtual image IM1. In this case, as described with reference to FIG. 4A, the virtual image IM2 results in a distorted shape with respect to the target virtual image IM1 illustrated by a dashed line due to the distortion aberration generated in the optical system such as the optical unit 12.

Therefore, in the present embodiment, as described with reference to FIG. 4B, the shape of the display surface 11a, which is the display portion of the imaging light emitting device 11, does not have a rectangular shape and is distorted. In this case, assuming in an ideal state without the distortion aberration, as a virtual image IM3 as a region illustrated by a mesh shape in a dashed line in FIG. 5C, the shape is distorted contrary to the virtual image IM2 in FIG. 5B. However, in practice, the distortion is canceled by the distortion aberrations generated in the optical unit 12, and the virtual image IM1 as the target state illustrated by the solid line in the drawings is visually recognized by the wearer US.

Figure 6:
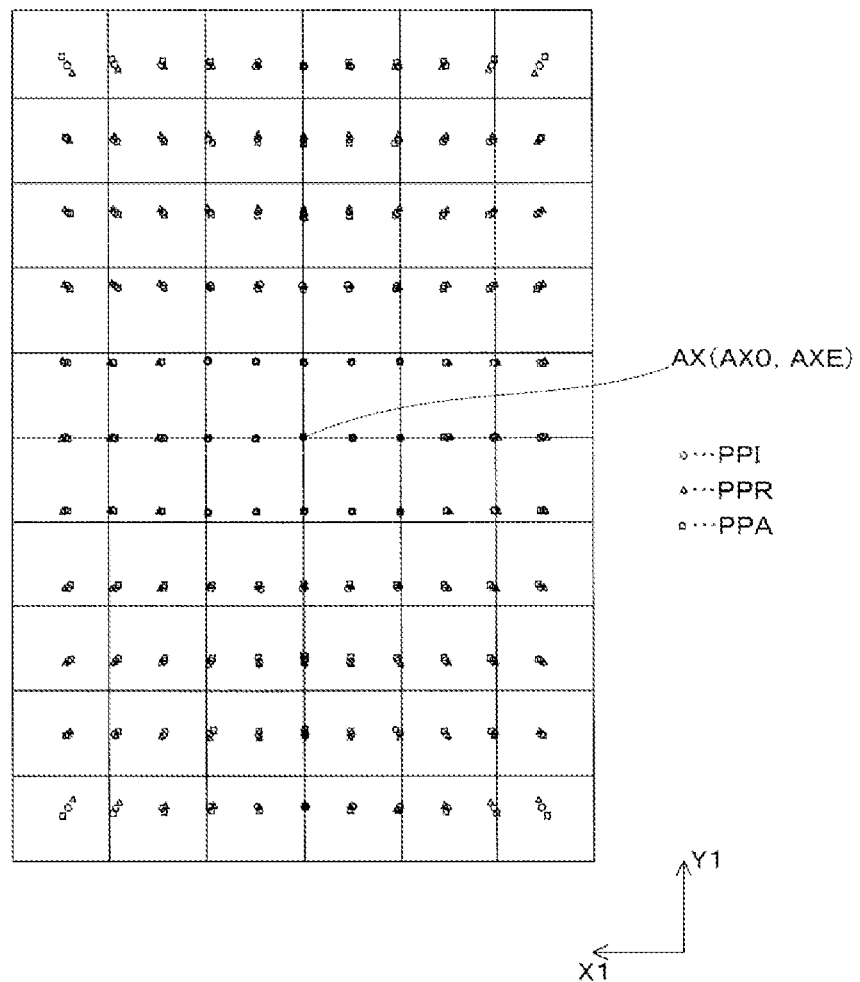
FIG. 6 is a conceptual diagram for describing an emission position of the light.

Hereinafter, with reference to FIG. 6, the above-described aspect will be described from the viewpoint of an emission position of the imaging light ML. FIG. 6 is a conceptual diagram for describing the emission position of the light, and first, in the drawing, an optical axis AX corresponds to the projection optical axis AX0 or the emission optical axis AXE illustrated in FIG. 2 and the like, and indicates a center of the image. In addition, a white circle point indicates an emission point position PPI of the light which is assumed. That is, the emission point position PPI is aligned on a grid point in a two-dimensional plane, and if in a system in which the distortion aberration does not occur, the emission point position PPI corresponds to a position of the light emission point (position of the pixel) of the display portion of the imaging light emitting device 11, and also corresponds to a position of each pixel of the image that is visually recognized as a virtual image. However, in practice, because affected by the distortion caused by the distortion aberration due to the optical system, if the imaging light ML is emitted from a position corresponding to the emission point position PPI on the panel side, a position that is actually visually recognized is a position PPR indicated by a white triangle point. Therefore, in the present embodiment, by emitting the imaging light ML from a position corresponding to a correction position PPA indicated by a white square point on the panel side, that is, by setting the correction position PPA as an image position which is the emission position on the display surface 11a, the image visually recognized as a virtual image is corrected so as to correspond to a position of the emission point position PPI. That is, while the emission point position PPI is uniformly aligned on the grid points, the correction position PPA is arranged non-uniformly in accordance with the position on the display portion (display surface 11a) of the imaging light emitting device 11. In other words from the viewpoint of the imaging light emitting device 11, the imaging light emitting device 11 emits the imaging light ML at different densities for each image position, as illustrated by the correction position PPA.

Here, in the example illustrated in the present embodiment, the optical unit 12 is a rotationally symmetric optical system centered on the optical axis AX corresponding to the projection optical axis AX0 or the like, that is, the optical unit 12 is a coaxial optical system having the optical axis AX as a rotationally symmetric axis. In this case, among each position on the image conceptually illustrated in FIG. 6, while influence of the distortion (positional deviation) due to the aberration is small at the closer side to the position of the optical axis AX, the influence is large at the periphery side away from the position of the optical axis AX. In other words, when viewed at each point in FIG. 6, a degree of a separation (degree of superimposition) between the white circle point (emission point position PPI), the white triangle point (position PPR), and the white square point (correction position PPA) at positions corresponding to each other changes as a distance from the optical axis AX increases. Therefore, an aspect in which the imaging light emitting device 11 is configured to correct the image at the peripheral side away from the position of the optical axis AX is assumed.

As described above, in the present embodiment, the virtual image display apparatus 100 includes an imaging light emitting device 11, and an optical unit 12 configured to guide imaging light ML emitted from the imaging light emitting device 11, and the imaging light emitting device 11 emits the imaging light ML at different densities in accordance with the distortion occurring in an optical system constituting the optical unit 12 and an image position (a position on the display portion of the imaging light emitting device 11). In this case, since the imaging light emitting device 11 emits the imaging light ML at different densities in accordance with the distortion occurring in the optical unit 12 and the image position, it is possible to reduce the load related to the correction of the distortion aberration (distortion) generated in the optical unit 12 and to reduce the size and simplify the apparatus.

Figure 7A:
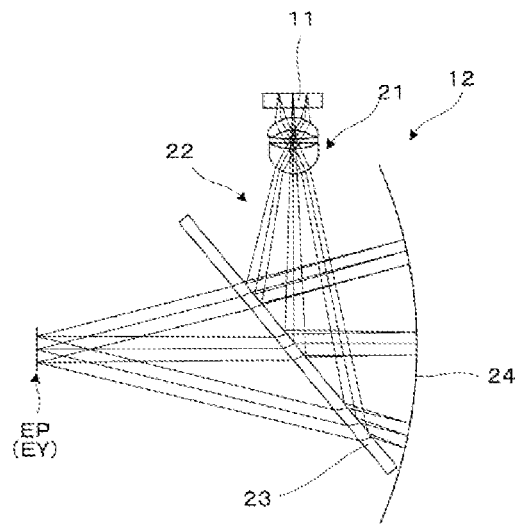
FIG. 7A is a side cross-sectional view illustrating a configuration example of the virtual image display device.

Next, a configuration example of the virtual image display apparatus according to the present embodiment will be described with reference to FIG. 7. Note that, in FIG. 7, for sake of simplicity, a side sectional view in which the turning mirror 22 (see FIG. 2 and the like) is omitted and developed is illustrated.

In the present embodiment, as an example of the optical system having a rotational symmetry axis, a so-called bird bath type optical system is illustrated. In a configuration example of the virtual image display apparatus 100 illustrated in FIG. 7A, the projection optical system 21 in the optical unit 12 is constituted by three lenses. In this case, the optical system can be made smaller compared to that constituted by four lenses illustrated as another example in FIG. 7B, and in particular, the distance from the transmission tilted mirror 23 and the concave transmission mirror 24 to the imaging light emitting device 11 can be reduced.

Figure 7B:
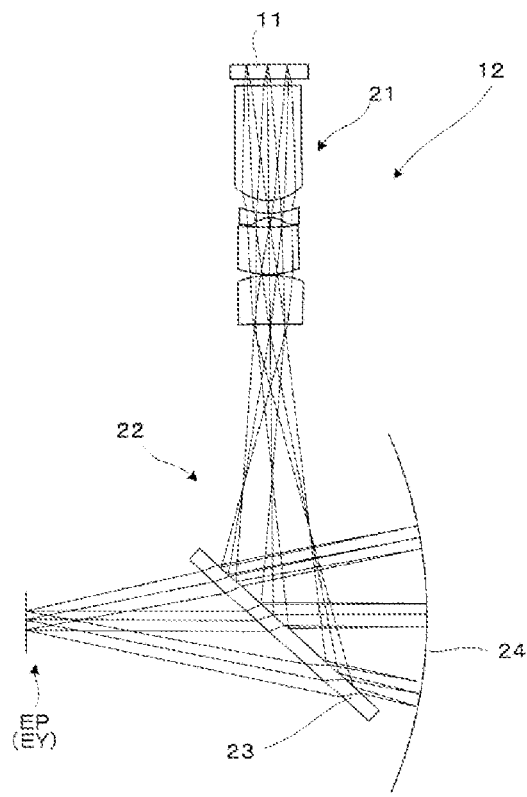
FIG. 7B is a side cross-sectional view illustrating another configuration example of the virtual image display device.

In addition, as illustrated in FIG. 7B as another example, in a case such as when the projection optical system 21 is constituted by four lenses, by placing a load of the aberration correction on the imaging light emitting device 11, it is possible to simplify the lens configuration by, for example, adopting a spherical lens for some or all of each lens, and the like.

Second Embodiment

Hereinafter, a virtual image display apparatus according to a second embodiment will be described. Note that the virtual image display apparatus according the second embodiment is obtained by modifying a part of the virtual image display apparatus according to the first embodiment, and description on common portions is omitted.

An example of an imaging light emitting device constituting the virtual image display apparatus of the second embodiment will be described with reference to FIG. 8 and the like.

Figure 8:
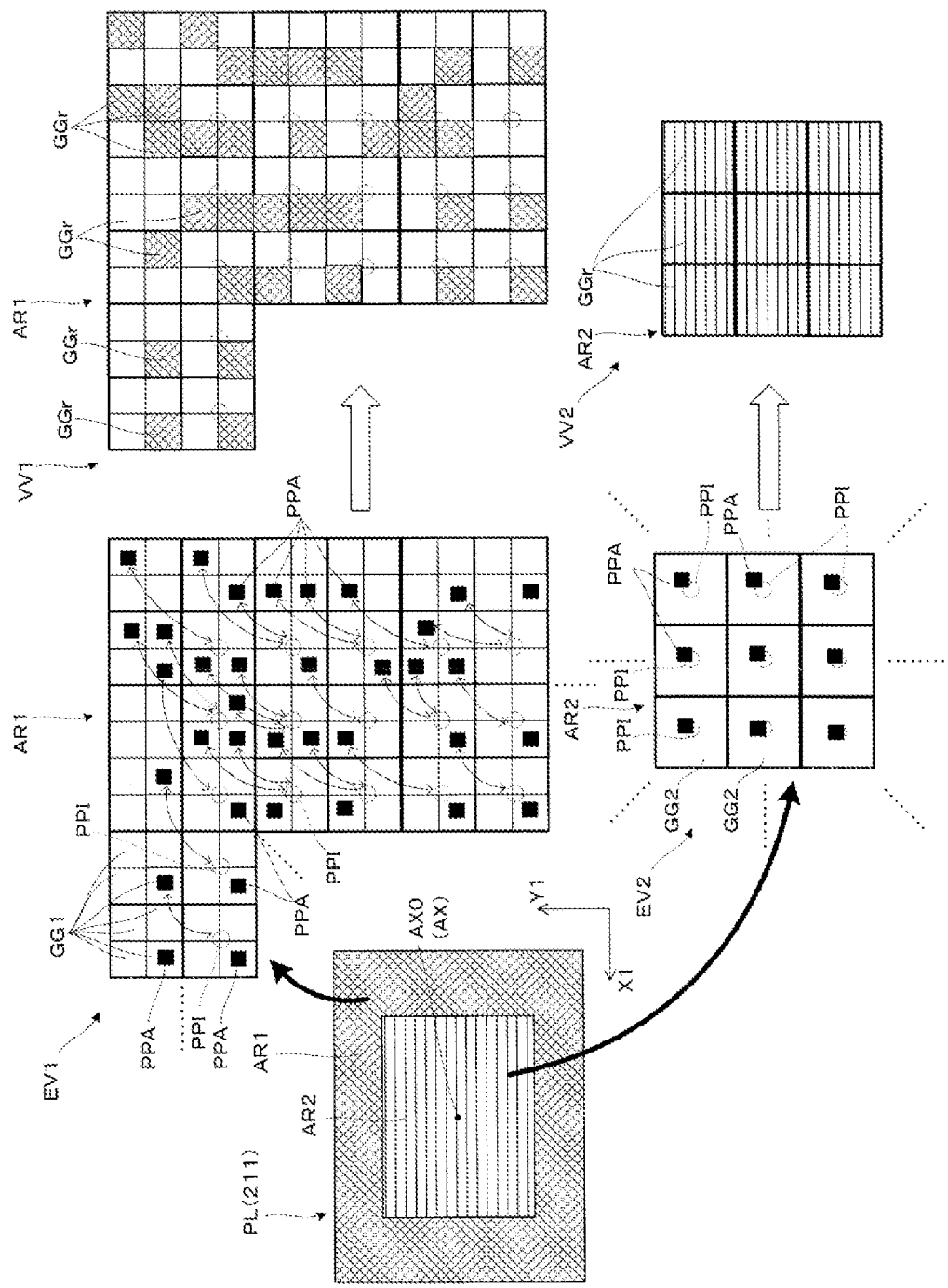
FIG. 8 is a conceptual diagram for describing an imaging light emitting device in the virtual image display device of a second embodiment.

FIG. 8 is a conceptual diagram for describing an imaging light emitting device 211 in the virtual image display apparatus according to the present embodiment, and conceptually illustrates a display panel PL that constitutes the imaging light emitting device 211 and a partially enlarged view thereof.

In the present embodiment, the imaging light emitting device 211 or the display panel PL includes a rectangular display portion, and is constituted by pixels having different resolutions (fineness) at a peripheral side away from the optical axis AX (projection optical axis AX0) and a center side close to the optical axis AX (projection optical axis AX0). Specifically, in a region AR1 at the peripheral side, the imaging light emitting device 211 is configured by a pixel GG1 equivalent to 4K (equivalent to the pixel number of 3840×2160) as in a partially enlarged state EV1. On the other hand, in a region AR2 at the center side, the imaging light emitting device 211 is configured by a pixel GG2 equivalent to full HD (equivalent to the pixel number of 1920×1080) as in a partially enlarged state EV2. That is, the region AR1 at the peripheral side is constituted by four (=2×2) times finer pixels than the region AR2 at the center side. Here, as illustrated, in the region AR1, the emission point position PPI is set on the grid point in units of four (=2×2) pixels. On the other hand, in the region AR2, the emission point position PPI is set to correspond to one pixel unit. That is, it is assumed that an image having a resolution equivalent to full HD is provided as the overall image.

In the above, first, since the amount of the aberration correction is large in the region AR1 at the peripheral side, an aspect in which the light is emitted from the correction position PPA corresponding to the emission point position PPI aligned on the grid points is employed, taking the distortion aberration into consideration. That is, the emission point position PPI indicates an ideal position when visually recognized as a virtual image. Therefore, by emitting the imaging light, which should be emitted as the light from the emission point position PPI, from a pixel GG1 that is at the correction position PPA whose correspondence with the emission point position PPI is illustrated in a bidirectional arrow in the state EV1, a desired virtual image is visually recognized by the wearer US. Note that, in the illustrated example, cases in which the correction position PPA corresponding to each emission point position PPI is singular and are in plural are mixed and illustrated, but it can be appropriately selected according to various factors, such as the amount of aberration correction and the adjustment of luminance. Further, in the above case, among the pixels GG1, only a part of the pixels GG1 which is located at the correction position PPA corresponding to the emission point position PPI is actually used. That is, only the pixel GGr illustrated by hatching in a state VV1 is used as a portion for emitting the imaging light in the region AR1.

On the other hand, since the amount of the aberration correction is small in the region AR2 at the center side, the difference between the emission point position PPI and the correction position PPA is as small as one pixel or less, as illustrated in the state EV2. That is, the correction is not required. Therefore, all of the pixels GG2 in the region AR2 correspond to the pixels GGr indicated by hatching in a state VV2.

When viewing the above in a different way, in the imaging light emitting device 211, a usage of the pixel at the peripheral side far from the position of the optical axis AX is lower than the usage of the pixel at the center side close to the position of the optical axis AX.

As described above, in the present embodiment, the imaging light emitting device 211 includes the display panel PL in which the pixel densities are different between the center side close to the position of the optical axis Ax and the peripheral side far from the position of the optical axis Ax. In particular, in the example of FIG. 8, by making the pixel density at the peripheral side higher than that at the center side, it is possible to select the pixel at an appropriate position according to the amount of position correction associated with the distortion aberration. In this case, for example, even if there is a range that is expanded in accordance with the distortion correction in the region AR1, the image can be formed without reducing the resolution (in the above example, maintaining equivalent to full HD).

Figure 9:
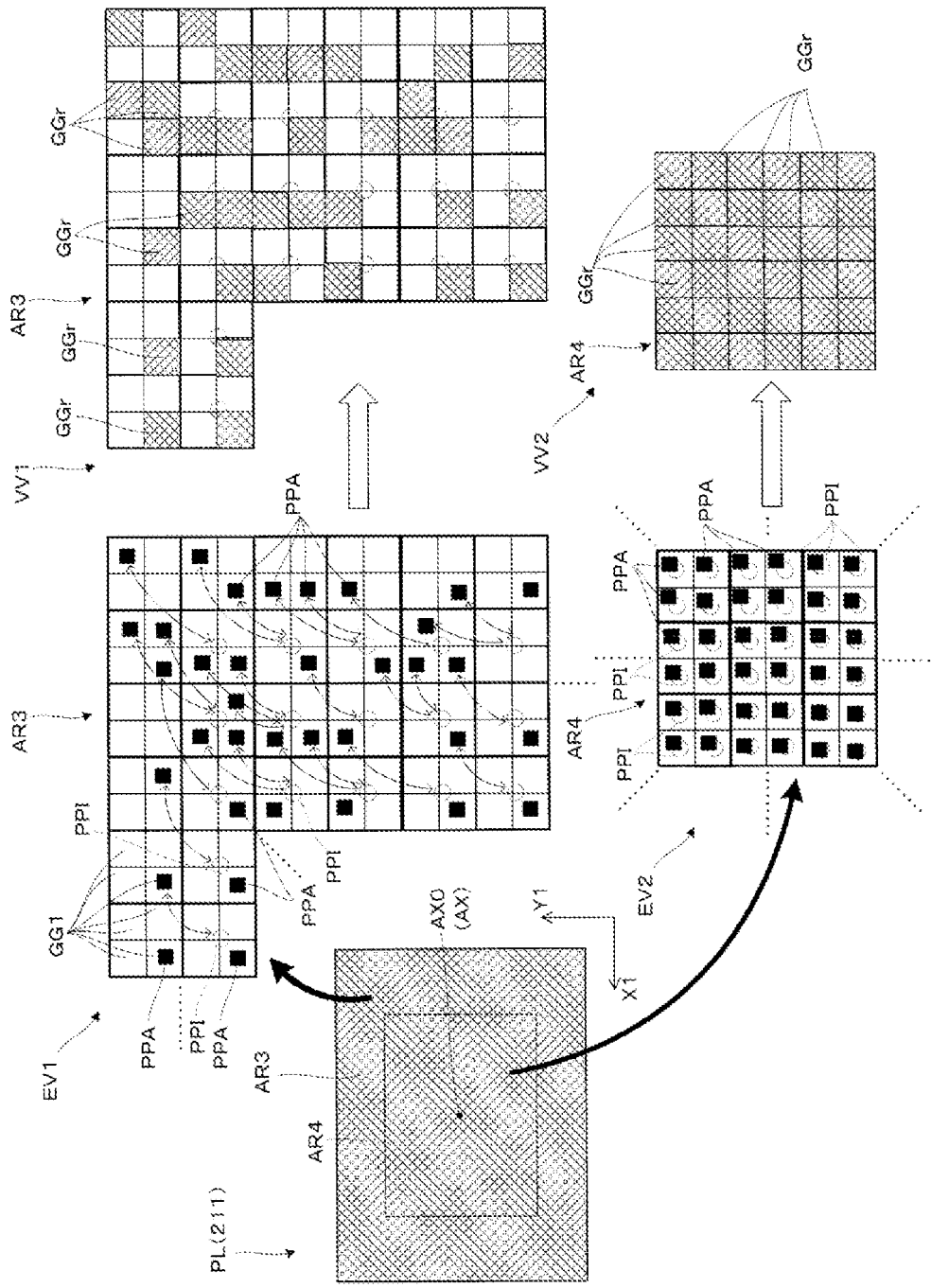
FIG. 9 is a conceptual diagram for describing an imaging light emitting device of a modified example.

Next, a modified example of the present embodiment will be described with reference to FIG. 9. FIG. 9 is a diagram corresponding to FIG. 8, and is common with the example of FIG. 8 in that the display panel PL constituting the imaging light emitting device 211 is provided with a region AR3 at the peripheral side and a region AR4 at the center side, but they are different in that they have the same resolution (for example, equivalent to 4K).

In the above, while the emission point position PPI in the region AR3 at the peripheral side is the same as the region AR1 in FIG. 8, the emission point position PPI at the center side is set to correspond to one pixel unit. That is, an aspect in which a higher-definition image is formed at a central side in the human eye, which is more sensitive, is employed.

Note that, in the above, by appropriately switching the image forming method in the region AR1 (AR3) at the peripheral side and the region AR2 (AR4) at the center side in the vicinity of the boundary, for example at the frame rate, the boundary portion may be controlled to blur so as not to be seen.

In addition, various aspects can be considered for determining the pixel GGr actually used in the region AR1 (AR3) at the peripheral side, and for example, it may be appropriately selected according to an error during assembly of the HMD 200 or the virtual image display apparatus 100, and the individual difference between the generated aberrations.

Furthermore, in the above-described example, the imaging light emitting device 211 or the display panel PL constituting the imaging light emitting device 211 has a rectangular shape. However, the imaging light emitting device 211 or the display panel PL is not limited thereto, for example, an aspect in which the pixels and the image are controlled as described above for the imaging light emitting device 11 having the distorted display portion exemplified in the first embodiment may be employed.

In the present embodiment as well, since the imaging light emitting device 211 emits the imaging light ML at different densities in accordance with the distortion occurring in the optical system constituting the optical unit 12 (referring to FIG. 2 and the like) and the image position, it is possible to correct the distortion aberration (distortion) and to reduce the size and simplify the apparatus. Further, in the case of the present embodiment, the aberration correction at the peripheral side of the panel side can be realized by selecting the pixel to use.

Third Embodiment

Hereinafter, a virtual image display apparatus and the like according to a third embodiment will be described with reference to FIG. 10 and the like. Note that the overall appearance is the same as that described with reference to FIG. 1 in the first embodiment, and thus is omitted.

Figure 10:
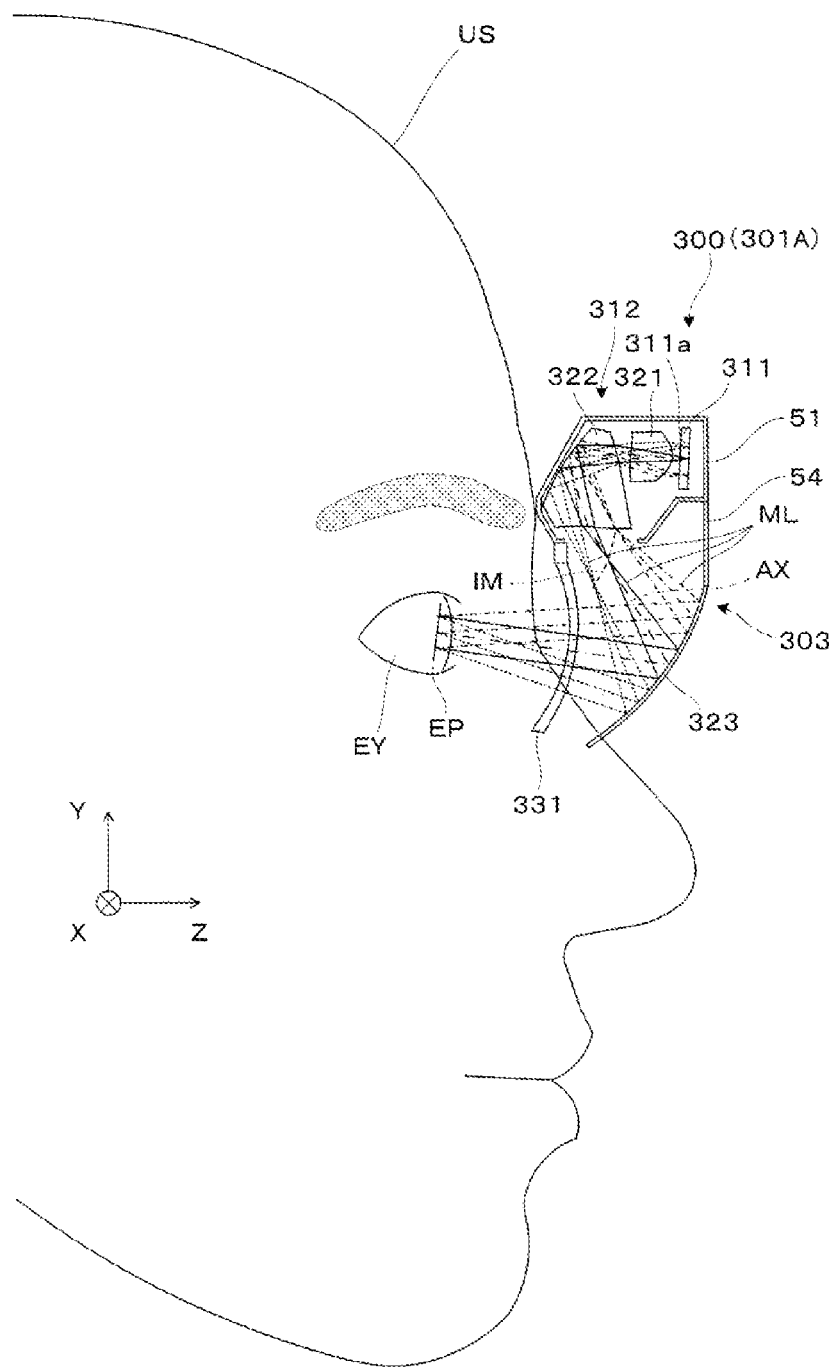
FIG. 10 is a side cross-sectional view describing an example of an internal structure of a virtual image display apparatus of a third embodiment.

As illustrated in a side cross-sectional view of an internal structure as an example illustrated in FIG. 10, in a virtual image display apparatus 300 of the present embodiment, a first display device 301a for the right eye includes an imaging light emitting device 311 and an optical unit 312 as optical elements. The optical unit 312 is also referred to as a light-guiding device in view of guiding the imaging light ML from the imaging light emitting device 311 to the formation position of the exit pupil EP.

The imaging light emitting device 311 is the same as that of the first embodiment and the like except for the shape. Therefore, the description thereof will be omitted here, and the shape of the imaging light emitting device 311 will be described later.

The optical unit 312 includes a projection optical system 321, a prism 322, and a see-through mirror 323. The projection optical system 321 collects the imaging light ML emitted from the imaging light emitting device 311 into a state close to a parallel luminous flux. The projection optical system 321 is a single lens in the illustrated example, and has an incident surface and an emission surface. The prism 322 includes an incident surface, an inner reflection surface, and an emission surface, and is configured to refract the imaging light ML emitted from the projection optical system 321 when the imaging light ML is incident on the incident surface, totally reflect the imaging light ML by the inner reflection surface, and refract the imaging light ML exiting the emission surface. The see-through mirror 323 reflects, toward the exit pupil EP, the imaging light ML emitted from the prism 322. The exit pupil EP is at a position where the imaging light from each point on a display surface 311a is incident thereon so as to superimpose from an angular direction corresponding to the position of each point on the display surface 311a in a predetermined divergent state or parallel state. The illustrated optical unit 312 has a FOV (field of view) of 44°. A display area of the virtual image by the optical unit 312 is rectangular, and the above-described 44° is a diagonal direction.

The projection optical system 321 and the prism 322 are housed in a case 51 together with the imaging light emitting device 311. The case 51 is made of a light-shielding material and includes a driving circuit (not illustrated) that operates the imaging light emitting device 311. An opening 51a of the case 51 has a size that does not interrupt the imaging light ML from the prism 322 toward the see-through mirror 323. The opening 51a of the case 51 may not be just an opening but may be covered with a protective cover 52 having light-transmissivity. The protective cover 52 does not have optical power and is made of a resin material or the like that allows the imaging light ML to pass therethrough without being attenuated. A storage space inside the case 51 can be sealed by the protective cover 52, and functions such as dust prevention, antisweating, and prevention of contact with the optical surface can be enhanced. The see-through mirror 323 is supported on the case 51 via a support plate 54. The case 51 or the support plate 54 is supported by the support device 101C (see FIG. 1), and the support plate 54 and the see-through mirror 323 constitute an appearance member 303. Note that an inner lens 331 is arranged behind the see-through mirror 323.

The optical unit 312 is an off-axis optical system. In other words, the projection optical system 321, the prism 322, and the see-through mirror 323 constituting the optical unit 312 are arranged to form the off-axis optical system. Note that the optical unit 312 is an off-axis optical system means that, in the optical elements 321, 322, and 323 constituting the optical unit 312, the optical path bends as a whole before and after light beam is incident on at least one reflection surface or refraction surface. Further, the optical axis AX of the optical unit 312, which is the off-axis optical system as described above, is arranged in a Z-shape when viewed in a cross section. In other words, in the drawings, the optical path from the projection optical system 321 to the inner reflection surface, the optical path from the inner reflection surface to the see-through mirror 323, and the optical path from the see-through mirror 323 to the exit pupil EP are folded back in the Z-shape in two stages.

Note that, in the drawings, an intermediate image IM is formed between the prism 322 and the see-through mirror 323.

Even in the virtual image display apparatus 300 as described above, depending on a configuration of the optical unit 312, a distortion aberration occurs due to the configuration thereof. In particular, in the optical unit 312 constituted by the off-axis optical system, a form of generating the aberration differs from that of the optical system having a rotational symmetry axis illustrated in the first embodiment and the like.

Hereinafter, an example of generation of distortion aberrations in the virtual image display apparatus 300 and correction thereof will be described with reference to FIG. 11 and the like.

Figure 11:
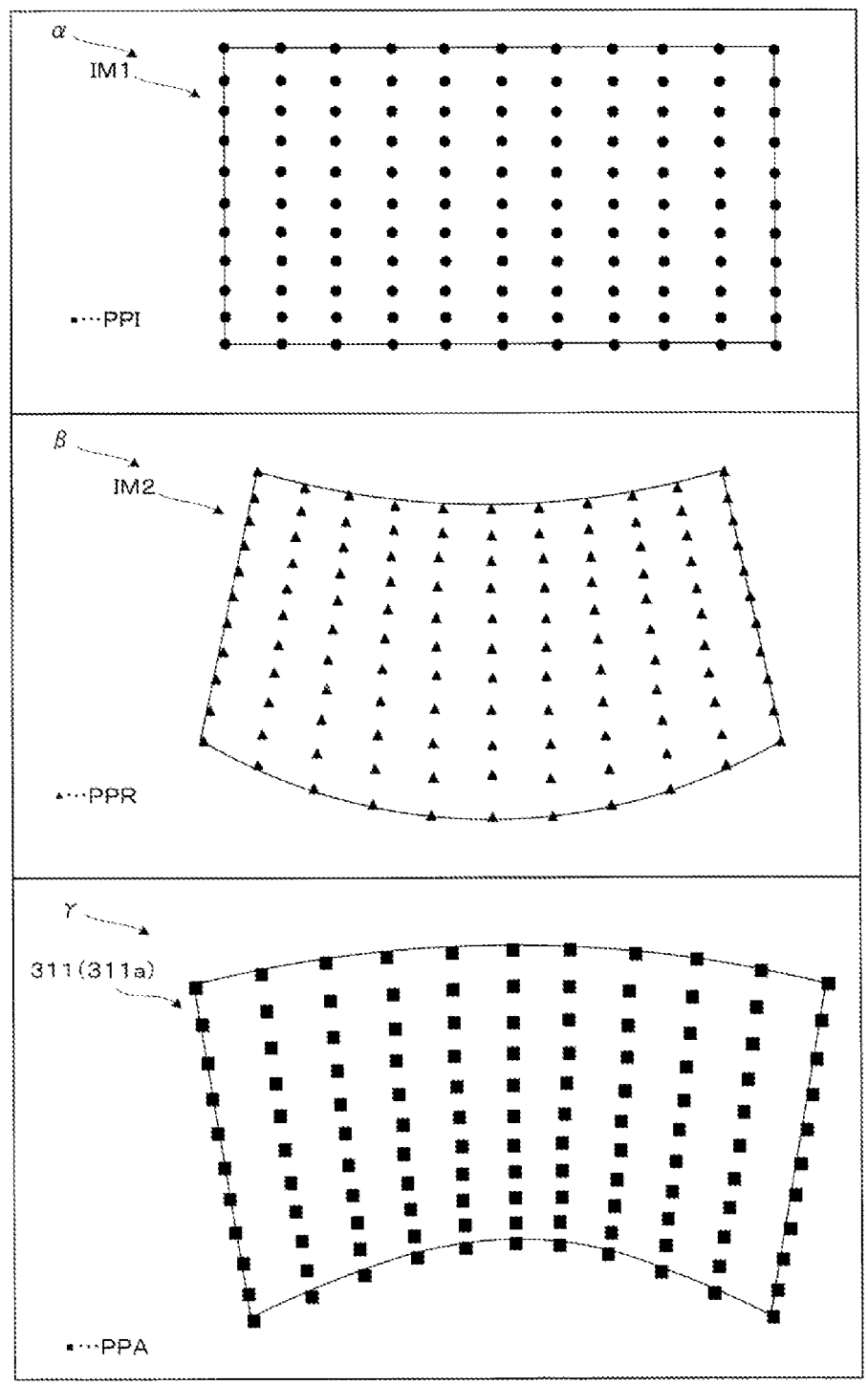
FIG. 11 is a conceptual diagram for describing a relationship between generated aberration and a display portion shape according to the aberration.

FIG. 11 is a conceptual diagram for describing a relationship between the aberration generated in the virtual image display apparatus 300 and the display portion shape of the imaging light emitting device 311 according to the aberration. Further, FIG. 12 is a conceptual diagram for describing a direction of distortion correction.

First, as illustrated in FIG. 11, in the same manner as described with reference to FIGS. 5, 6, and the like, in a state α, the assumed emission point position PPI of light is illustrated to be aligned on a grid point in a two-dimensional plane, and in the drawing, the emission point position PPI is illustrated by a black circle point. Further, in a state β, when the imaging light ML is emitted from a position corresponding to the emission point position PPI on the panel side, a distorted position PPR (further, a position of the distorted virtual image IM2) generated by the distortion aberration is indicated by a black triangle point. On the other hand, in a state γ, the correction position PPA from which the imaging light ML should be emitted on the panel side is indicated by a black square point. In other words, by allowing the imaging light emitting device 311 to have a shape and an emission position corresponding to the correction position PPA on the display surface 311a, a virtual image IM1 as an image corresponding to the emission point position PPI can be visually recognized by the wearer US.

In the present embodiment, as described above, the optical system is off-axis optical system, that is, the optical system is non-axially rotationally symmetric, which is not axially rotationally symmetric. However, in the present example, since the optical system is line symmetric, the imaging light emitting device 311 or the display surface 311a has a fan shape according to an off-axis direction. In other words, as illustrated in the drawing, the display surface 311a has a shape in which the upper side is extended more than the lower side as compared with a rectangular state and both of them are convex on the upper side.

Figure 12:
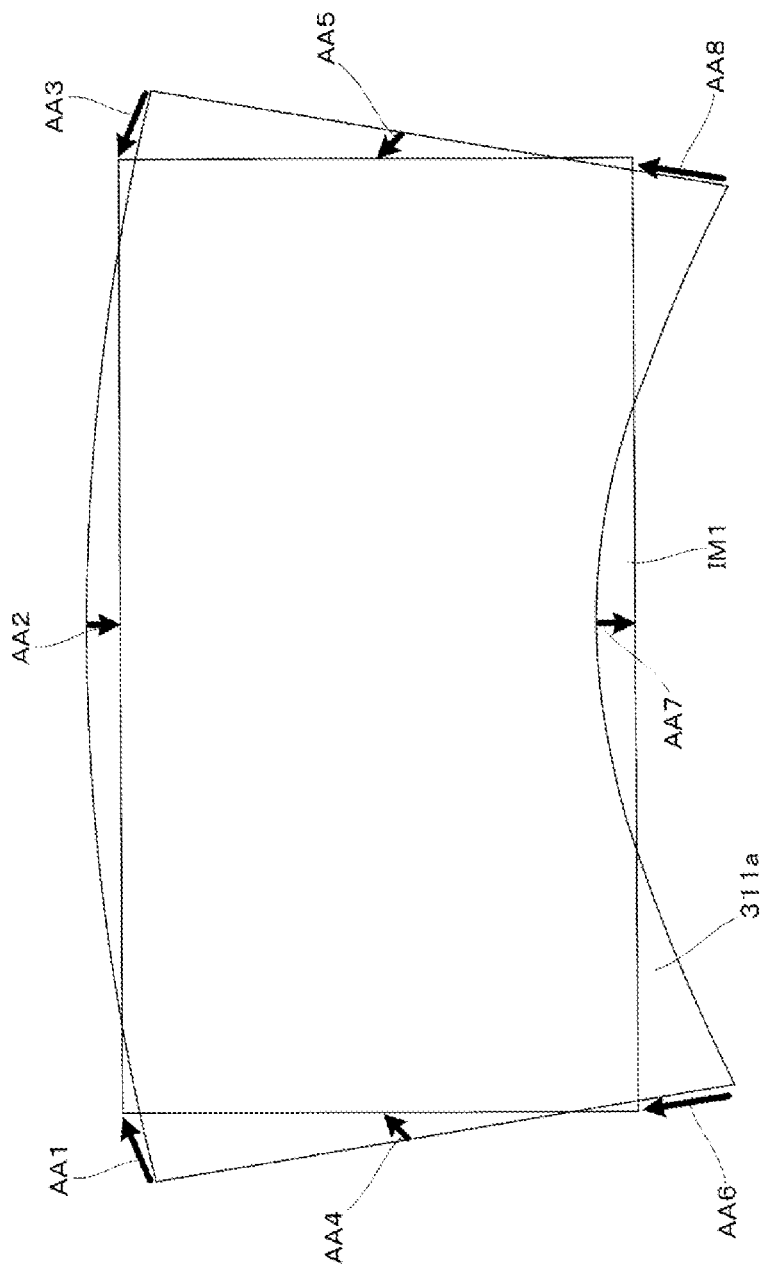
FIG. 12 is a conceptual diagram for describing a direction of distortion correction.

Note that, in the above case, the correspondence between the display surface 311a and the virtual image IM1 is as illustrated in FIG. 12. In this case, as for a direction of distortion correction, the reduction and expansion thereof are different or mixed depending on the location (image position), as illustrated by each of arrows AA1 to AA8. For example, as illustrated by arrows AA1 and AA3, the upper side (+Y1 side) of four corners of the display surface 311a or the virtual image IM1 is reduced in an X1 direction (horizontal direction, lateral direction) while being expanded in a Y1 direction (vertical direction, longitudinal direction). On the other hand, for example, as illustrated by arrows AA6 and AA8, the lower side (−Y1 side) of four corners of the display surface 311a or the virtual image IM1 is expanded in the X1 direction (horizontal direction, lateral direction) while being reduced in the Y1 direction (vertical direction, longitudinal direction). That is, in the above-described case, in the imaging light emitting device 311, the direction of the distortion correction includes both reduction and expansion.

In this case, in particular, the expansion direction acts on the side where the resolution is lowered. In this regard, for example, as described as an example with reference to FIG. 8 in the second embodiment, the image quality can be maintained by setting the pixel density high in the corresponding range, that is, the range extended in accordance with the distortion correction in the display panel of the imaging light emitting device 311.

In the present embodiment as well, since the imaging light emitting device 311 emits the imaging light ML at different densities in accordance with the distortion occurring in the optical system constituting the optical unit 312 and the image position, it is possible to correct the distortion aberration (distortion) and to reduce the size and simplify the apparatus.

Figure 13:
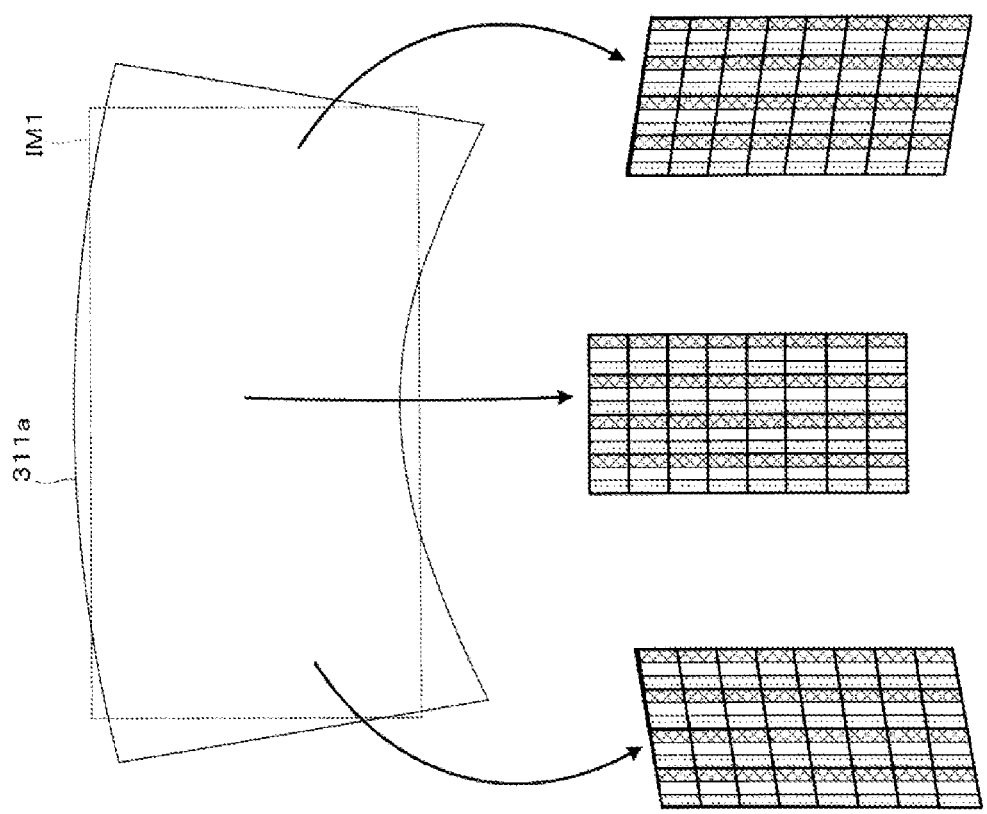
FIG. 13 is a conceptual diagram for describing a pixel configuration of a modified example in the imaging light emitting device.

Hereinafter, a pixel configuration of a modified example in the imaging light emitting device will be described with reference to FIG. 13 and the like. OFirst, as illustrated in FIG. 13, it is also conceivable to arrange the pixels along the shape of the distortion. That is, as illustrated in a partially enlarged view in the drawing, in the display surface 311a, for example, a parallelogram pixel may be applied so as to conform to the outline of the display surface 311a in a fan shape on the peripheral side with more corrections, while a normal rectangular pixel shape is applied on the center side with less corrections. Alternatively, as illustrated in FIG. 14, it may be considered that the rectangular pixels are arranged so as to be tilted according to the outline of the display surface 311a.

Figure 14:
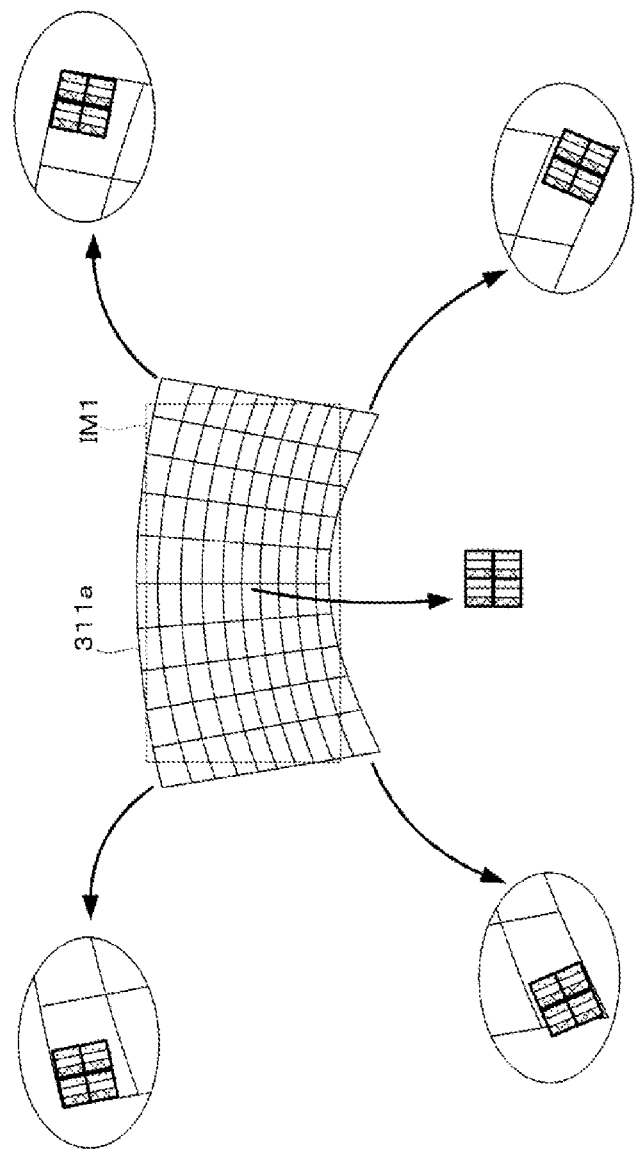
FIG. 14 is a conceptual diagram for describing a pixel configuration of another modified example in the imaging light emitting device.
Figure 15:
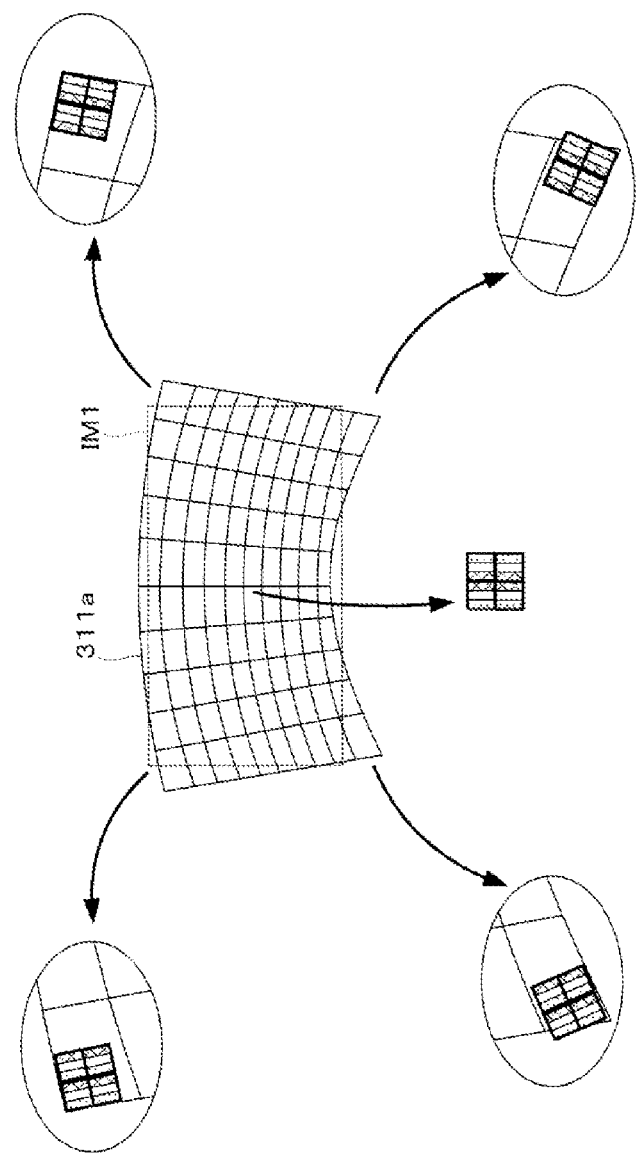
FIG. 15 is a conceptual diagram for describing a pixel configuration of still another modified example in the imaging light emitting device.

Further, in addition to the above, as illustrated in FIG. 15, the arrangement of R (red) G (green) B (blue) constituting each pixel may be different from the example illustrated in FIG. 14, for example, may be mirror-symmetrical on the right side and the left side. That is, in consideration of color aberration, RGB may be arranged so that the color aberration can be reduced. Note that, as illustrated in the drawings, in addition to being arranged mirror-symmetrically on the right and left, they may be symmetrical on the top and bottom, or the top, bottom, left, and right thereof may be arranged in a diagonal direction together.

Modifications and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display apparatus in the above-described embodiments, a self-luminous type display device such as an organic EL element, a LCD, and another light modulating element are used as the imaging light emitting device. Instead, a configuration in which a laser scanner obtained by combining a laser light source and a scanner, such as a polygon mirror, may also be used as the imaging light emitting device. That is, it is also possible to apply the present invention to a laser retinal projection-type head-mounted display.

A light control device that controls light by limiting transmitted light may be attached to the external side of the see-through mirror. The light control device adjusts a transmittance, for example, electrically. Mirror liquid crystals, electronic shades, and the like may be used as the light control device. The light control device may adjust a transmittance according to external light brightness. When the light control device blocks the external light, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

In the description above, the virtual image display apparatus 300 is assumed to be mounted and used on a head, but the virtual image display apparatus 300 described above may also be used as a hand-held display that is not mounted on a head and is viewed into it like a pair of binoculars. In other words, the head-mounted display also includes a hand-held display in the present disclosure.

Further, although the apparatus that guides light in the vertical direction has been described above, the present application may be applied to the apparatus that guides light in the horizontal direction. Further, even in a case where a laser beam is scanned to form an image, the same image forming as described above can be performed by adjusting a pulse of the laser beam and the operation timing.

Further, when the minimum pixel of the panel becomes small by performing the correction on the panel side, it is conceivable to use an optical system that takes this into consideration for resolution. For example, while a spatial frequency of 50 lp/mm corresponds to a normal pixel pitch, the spatial frequency of 60 lp/mm corresponding to the minimum pixel pitch of the display surface 11*a*, which is a correction panel, is set to be resolved. Specifically, it is conceivable to design MTF to be equal to or more than 10% at the spatial frequency of 60 lp/mm.

Further, in the above, for example, in FIG. 1, it is conceivable to configure the emission optical axis AX so as to extend at an angle of approximately 10° downward with respect to the forward +Z direction. By setting the emission optical axis AX downward by approximately 10° on the forward side with respect to the horizontal Z-axis, it is possible to reduce the fatigue of the eye EY of the wearer US who observes the virtual image. In this case, the shape of the imaging light emitting device 10 can be appropriately changed as necessary for the correction on the panel side.

As described above, the virtual image display apparatus according to a specific aspect includes an imaging light emitting device, and an optical unit configured to guide imaging light emitted from the imaging light emitting device, and the imaging light emitting device emits the imaging light at different densities in accordance with a distortion generated in an optical system constituting the optical unit and an image position.

In the above-described virtual display apparatus, since the imaging light emitting device emits the imaging light at different densities in accordance with the distortion occurring in an optical system constituting the optical unit and the image position, it is possible to reduce the load related to the correction of the distortion aberration (distortion) in the optical system and to reduce the size and simplify the apparatus.

In the specific aspect, the imaging light emitting device includes a display portion that is distorted according to the distortion generated in the optical unit. In this case, the imaging light can be emitted from a desired image position.

In another aspect, the optical unit is constituted by a rotationally symmetric optical system centered on an optical axis, and the imaging light emitting device is configured to correct an image at a peripheral side away from a position of the optical axis. In this case, image quality can be maintained by correcting the image at the peripheral side where the aberration is likely to occur.

In yet another aspect, the optical unit includes a projection optical system configured to project the imaging light emitted from the imaging light emitting device, a turning mirror configured to reflect the imaging light from the projection optical system in a crossing direction, a transmission mirror configured to reflect a part of the imaging light from the turning mirror, and a concave mirror configured to reflect, toward the transmission mirror, the imaging light reflected by the transmission mirror, thereby forming an exit pupil. In this case, it is possible to reduce the size of the device while maintaining the optical performance by bending the optical path.

In yet another aspect, the optical unit includes a projection optical system configured to project the imaging light emitted from the imaging light emitting device, a prism configured to refract the imaging light emitted from the projection optical system when the imaging light is incident on an incident surface, totally reflect the imaging light by an inner reflection surface, and refract the imaging light exiting an emission surface, and a see-through mirror configured to reflect, toward an exit pupil, the imaging light emitted from the prism. In this case, it is possible to reduce the size of the device while maintaining the optical performance by using the prism.

In yet another aspect, the optical unit is constituted by a non-axially rotationally symmetric optical system, and the imaging light emitting device has a display portion distorted in a fan shape. In this case, the correction required for the non-axially symmetric optical system can be performed.

In yet another aspect, in the imaging light emitting device, a direction of a distortion correction includes both reduction and expansion. In this case, the correction can be appropriately performed by the reduction and expansion.

In yet another aspect, the imaging light emitting device includes a display panel in which pixel densities are different between a center side close to a position of an optical axis and a peripheral side far from the position of the optical axis. In this case, the density of emitting the imaging light can be adjusted according to a correction amount that is different for each position.

In yet another aspect, in the display panel, the pixel density in a range expanded according to a distortion correction is set to be high. In this case, resolution can be maintained even in the range that is expanded in accordance with the distortion correction.

In yet another aspect, in the imaging light emitting device, a usage of a pixel at a peripheral side far from a position of an optical axis is lower than the usage of a pixel at a center side close to the position of the optical axis. In this case, by changing the pixel usage depending on the position, the desired aberration correction can be performed.

In yet another aspect, the optical unit guides the imaging light to form an exit pupil.

What is claimed is:

1. A virtual image display apparatus comprising:
   an imaging light emitting device configured to include a display portion emitting imaging light, and
   an optical unit configured to guide the imaging light emitted from the imaging light emitting device,
   wherein
   the display portion has a first region and a second region, the first region according to a distortion generated in the optical unit, a number of pixels in the first region being different from a number of pixels in the second region,
   the optical unit includes a projection optical system, a turning mirror, a transmission mirror, and a concave mirror,
   the projection optical system projects the imaging light emitted from the imaging light emitting device,
   the turning mirror reflects the imaging light to a direction crossing with the imaging light from the projection optical system,
   the transmission mirror reflects a part of the imaging light from the turning mirror and transmits other part of the imaging light, and
   the concave mirror has a concave shape and reflects toward the transmission mirror, the imaging light reflected by the transmission mirror, thereby forming an exit pupil.

2. The virtual image display apparatus according to claim 1, wherein
   the display portion is distorted according to the distortion generated in the optical unit.

3. The virtual image display apparatus according to claim 1, wherein
   the optical unit is a rotationally symmetric optical system centered on an optical axis,
   the first region is a region away from the optical axis,
   the second region is a region corresponding to the optical axis, and
   the number of pixels in the first region is more than the number of pixels in the second region.

4. The virtual image display apparatus according to claim 1, wherein
   the imaging light emitting device includes a display panel, the display panel having the display portion,
   the first region that is corresponding to an optical axis, and
   the second region that is away from the optical axis.

5. The virtual image display apparatus according to claim 4, wherein
   in the display panel, a pixel density in a range expanded according to a distortion correction is set to be high.

6. The virtual image display apparatus according to claim 1, wherein
   in the imaging light emitting device, a usage of a pixel at the first region being away from an optical axis is lower than a usage of a pixel at the second region being corresponding to the optical axis.

7. The virtual image display apparatus according to claim 1, wherein the optical unit guides the imaging light to form an exit pupil.

* * * * *